Nov. 18, 1924.  
F. L. BAKER  
1,515,822  
LUBRICATING SYSTEM FOR MOTOR VEHICLES  
Filed June 7, 1922
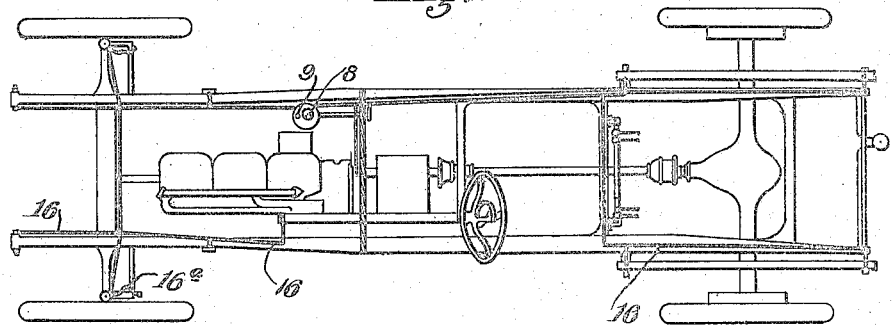
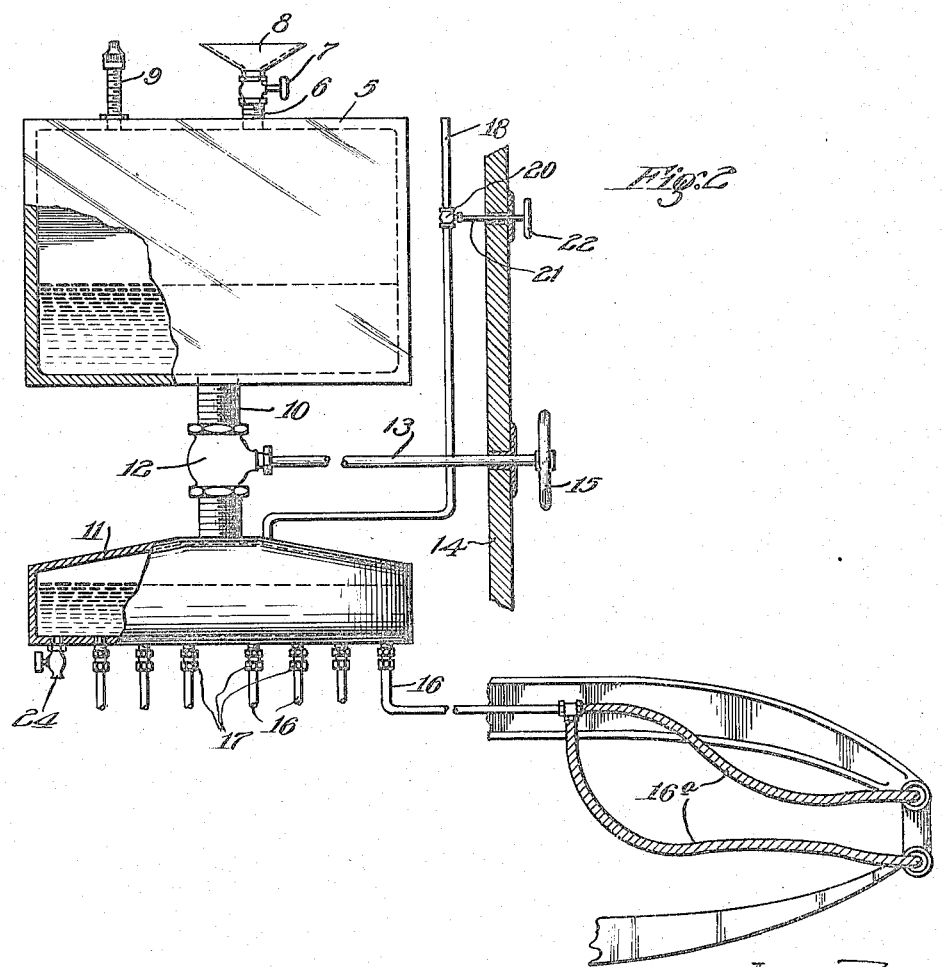
Inventor  
Frank L. Baker  
By Fred Gerlach, his Atty.

Patented Nov. 18, 1924.

1,515,822

UNITED STATES PATENT OFFICE.

FRANK L. BAKER, OF CHICAGO, ILLINOIS.

LUBRICATING SYSTEM FOR MOTOR VEHICLES.

Application filed June 7, 1922. Serial No. 566,474.

*To all whom it may concern:*

Be it known that I, FRANK L. BAKER, a citizen of the United States, and a resident of Chicago, in the county of Cook and State of Illinois, have invented certain new and useful Improvements in Lubricating Systems for Motor Vehicles, of which the following is a full, clear, and exact description.

The invention relates to lubricating systems for motor vehicles and its object is to provide an improved system by which the several bearings may be conveniently and periodically lubricated under pressure. Another object of the invention is to provide an improved system of this character in which provision is made for lubricating the bearings by gravity if desired.

The invention consists in the several novel features hereinafter set forth and more particularly defined by claims at the conclusion hereof.

In the drawings; Fig. 1 is a diagrammatic view of an automobile provided with the invention. Fig. 2 is a view partly in section and partly in elevation of the lubricating system.

The invention is exemplified in a structure comprising a reservoir 5 which is closed and adapted to retain a considerable supply of lubricating oil. An inlet pipe 6 is connected to the top of the reservoir and is provided with a valve 7 which, when open, will permit oil from a funnel 8 to gravitate into the reservoir. A stem 9 containing a check-valve, such as is usually provided on the inner tube of a pneumatic tire, is also connected to the top of the reservoir 5 and forms a connection which is adapted to be connected to a supply of compressed air by which the oil in the reservoir may be put under as much pressure as desired. The usual check-valve in the stem 9 automatically closes to retain the pressure in the reservoir as well understood in the art. The reservoir is usually placed at some convenient point under the engine-hood.

A pipe 10 is connected to the bottom of the reservoir 5 and leads into the top of a distributing tank 11. A valve 12 is included in pipe 10 to control the flow of oil from the reservoir into the distributing tank. The stem 13 of this valve is extended rearwardly through the dashboard 14 and is provided with a handle 15 within convenient reach of the driver of the automobile. A series of pipes 16, usually formed of copper are connected to the bottom of the distributer tank by couplings 17 and lead to the different bearings which are to be periodically lubricated. Pipes 16 are usually connected to flexible pipe sections 16ª particularly where the bearings move relatively to the chassis on which the tank and reservoir are supported. The upper portion of the distributer tank 11 slopes from the ends to the pipe 10 so as to prevent air pockets from being formed as the result of the movement of the vehicle when there is a column of oil in the tank.

A vent pipe 18 is connected to the top of the distributer tank and extends rearwardly and thence upwardly. The upwardly extended portion is provided with a valve 20 which is provided with a stem 21 extending through the dash-board 14 and there provided with a handle 22 which is also within convenient reach of the driver of the vehicle. When the valve 20 is open and valve 12 is closed, the distributer tank may be open to the atmosphere so that any oil therein will flow through the distributer pipes 16 to the respective bearings by gravity. A drain cock 24 is connected to the distributing tank so that it may be emptied when desired.

In practice, valve 12 will be closed and the reservoir 5 will be filled with oil and kept closed at valve 7. A connection will then be made with the stem 9 to force air into the reservoir and put the oil therein under the desired pressure necessary to force it to and through the bearings of the vehicle. The check-valve in the stem 9 will cause the air to be retained in the reservoir to keep the oil therein under the desired pressure. When the bearings are to be lubricated or flushed with oil under pressure, it is only necessary to open the valve 12 which will cause the oil in reservoir 5 to pass down into the distributer tank 11 and thence through the connections 16 to the bearings. In this manner, all of the bearings connected to the distributer tank may be simultaneously lubricated or flushed under pressure. Normally, valve 12 will be kept closed. When the bearings are being lubricated under pressure, valve 20 will also be closed. If it should be desired to continuously lubricate the bearings by gravity, this may be done by opening the valve 20 so that the top of the tank 11 will be open to atmosphere through pipe 18 so that oil in the distributing tank will be fed by gravity through pipe 16 to the bearings.

The invention exemplifies a lubricating system for automobiles in which the distributer pipes are connected to a distributing tank which is supplied with oil from a reservoir under control of a single valve; in which provision is made for lubricating the bearings by gravity when desired, while the oil in the reservoir is retained under pressure; in which a large number of bearings may be simultaneously and conveniently oiled.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a lubricating system for automobiles, the combination of a closed oil reservoir, a connection for putting the oil in the reservoir under pressure, a distributing tank, a valve between the reservoir and the tank for controlling the delivery of oil under pressure into the distributing tank, a series of pipes leading from the tank to different bearings of the automobile, and means to deliver air under atmospheric pressure directly to said distributing tank to permit the gravity flow through said series of pipes.

2. In a lubricating system for automobiles, the combination of a closed oil reservoir, a connection for putting the oil in the reservoir under pressure, a distributing tank, a valve for controlling the delivery of oil under pressure from the reservoir to the tank, and a vent pipe directly connected to the tank to allow the oil therein to be fed to the bearings by gravity when the valve is closed.

3. In a lubricating system for automobiles, the combination of a closed oil reservoir, a connection for putting the oil in the reservoir under pressure, a distributing tank, a valve for controlling the delivery of oil under pressure from the reservoir to the tank, a vent pipe directly connected to the tank, and a valve in the vent pipe for controlling the delivery of air under atmospheric pressure directly to said distributing tank to permit the gravity flow of oil to the bearings when the valve for controlling the delivery of oil from the reservoir to the tank is closed.

Signed at Chicago, Illinois, this 29th day of May, 1922.

FRANK L. BAKER.